June 1, 1965 U. C. GROSSMANN ET AL 3,186,182
LOW-TEMPERATURE, LOW-PRESSURE SEPARATION OF GASES
Filed May 27, 1963
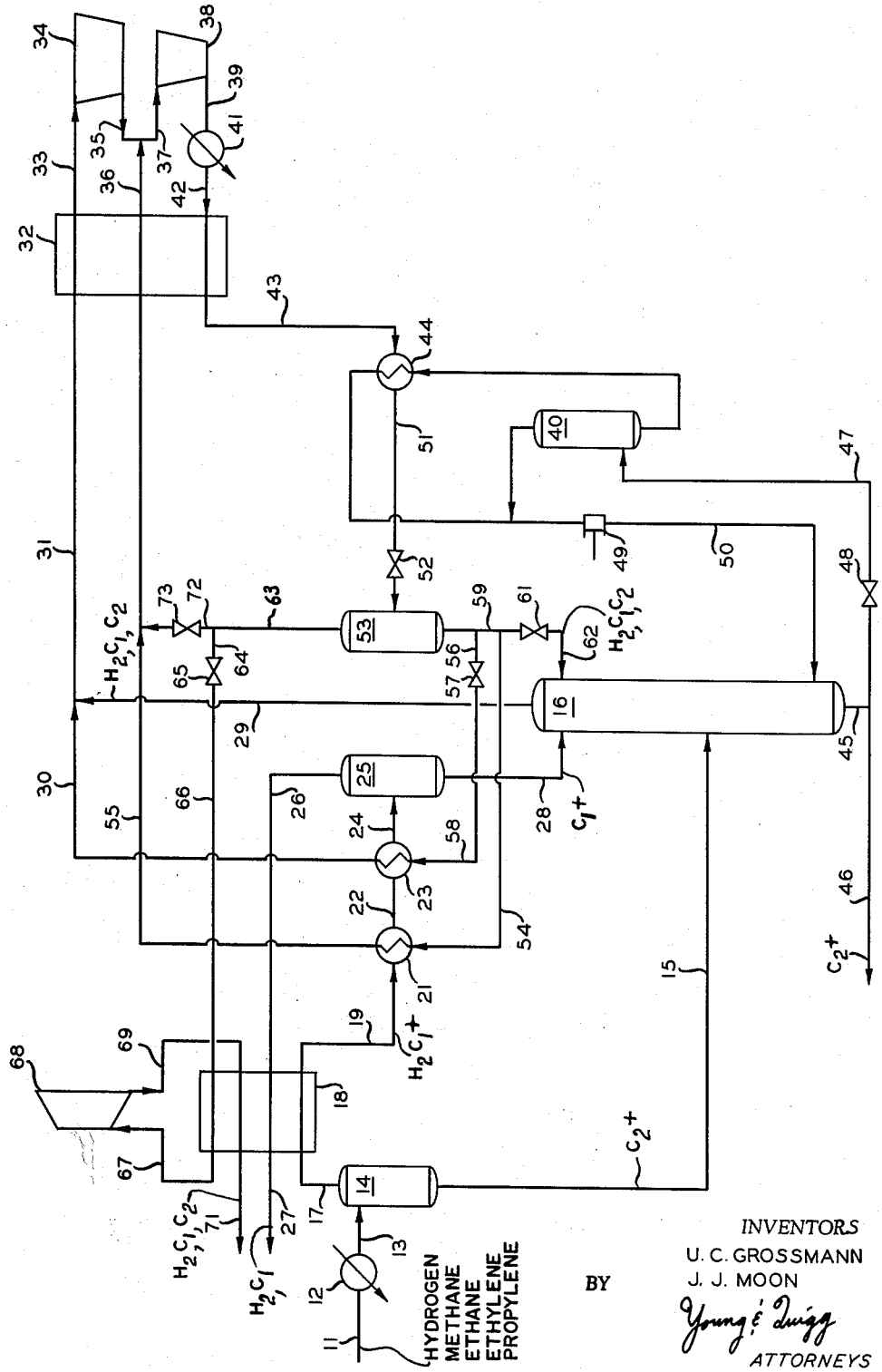
INVENTORS
U. C. GROSSMANN
J. J. MOON
BY
*Young & Quigg*
ATTORNEYS

United States Patent Office 3,186,182
Patented June 1, 1965

3,186,182
LOW-TEMPERATURE, LOW-PRESSURE
SEPARATION OF GASES
Ugo C. Grossmann, Seuzach, Zurich, Switzerland, and
John J. Moon, Bartlesville, Okla., assignors to Phillips
Petroleum Company, a corporation of Delaware
Filed May 27, 1963, Ser. No. 283,348
7 Claims. (Cl. 62—26)

This invention relates to a low-temperature, low-pressure system and process for the separation of gases. In one aspect the invention relates to demethanization of a gas. In a more specific aspect the invention relates to a demethanization of a cracked gas containing considerable quantities of hydrogen in addition to $C_2$ and $C_3$ hydrocarbons. In a further aspect the invention relates to a demethanization of a gas produced by the cracking of ethane for the production of ethylene.

An object of the invention is to provide improved method and apparatus for the separation of gases. Another object of the invention is to provide improved method and apparatus for the demethanization of gases. Another object of the invention is to provide improved demethanization process and apparatus having a lower refrigeration requirement. Yet another object of the invention is to provide an improved demethanization fractionation system having a greater degree of separation. A still further object of the invention is a reduction in the amount of ethylene lost overhead in a demethanization fractionation process.

Other aspects, objects, and advantages of the invention will become apparent from a study of the disclosure, the drawing and the appended claims to the invention.

The present invention resides substantially in the combination, construction, arrangement and relative location of parts, steps and series of steps, involved in a method for demethanizing a gas comprising methane, ethylene, ethane, propylene and hydrogen, comprising chilling said feed gas in a first chilling zone to a temperature sufficiently low to condense a portion of the $C_2^+$ hydrocarbons contained in said feed gas at a superatmospheric pressure and thereby produce a first uncondensed gas stream and a first liquid condensate stream, passing said first liquid condensate stream into a fractionation zone, passing said first uncondensed gas stream through a second chilling zone and therein chilling said first uncondensed gas stream to a temperature sufficiently low to condense substantially all of the $C_2^+$ hydrocarbons contained in said first uncondensed gas stream and thereby produce a second uncondensed gas stream and a second liquid condensate stream, passing said second uncondensed gas stream through said second chilling zone in indirect heat exchanging relationship with said first uncondensed gas stream, passing said second liquid condensate stream into said fractionation zone, withdrawing an overhead vapor stream from said fractionation zone, passing said overhead vapor stream through a heat exchange zone wherein said overhead vapor stream is heated, compressing the thus heated overhead vapor stream, chilling the thus compressed overhead vapor stream, flashing the thus cooled compressed overhead vapor stream to produce a third uncondensed gas stream and a third liquid condensate stream, passing a first portion of said third liquid condensate stream through said second chilling zone in indirect heat exchanging relationship with said first uncondensed gas stream, introducing a second portion of said third liquid condensate stream into said fractionation zone as reflux therefor, withdrawing at least a portion of said third uncondensed gas stream as an overhead product of said fractionation zone, and withdrawing a bottoms product from said fractionation zone, said bottoms product comprising substantially all of the $C_2^+$ hydrocarbons introduced into said fractionation zone.

Referring now to the drawing there is illustrated a diagrammatic representation of a combination of apparatus suitable for carrying out the process of the invention. While the invention is applicable to the separation of various gaseous feed stocks, the invention will be described in terms of the demethanization of a feed stock produced in the cracking of ethane, propane, and/or butane and deoiled for the removal of propane and higher boiling hydrocarbons. Such a feed stock contains in addition to methane large quantities of ethylene, ethane, and hydrogen, along with a small proportion of propylene. The gas feed to be separated is passed by way of line 11 into indirect heat exchanger 12 wherein a portion of the gas feed is condensed, and the thus cooled and partially condensed gas feed is then passed by way of line 13 into phase separator 14. In the exemplary process a major portion of the $C_2^+$ hydrocarbons is generally condensed upon passage through heat exchanger 12. While heat exchanger 12 is illustrated as a single stage it is within the contemplation of the invention to utilize as many such stages as desired. The primarily $C_2^+$ condensate is withdrawn from phase separator 14 and passed by way of line 15 into a feed inlet of fractionator 16. The uncondensed gas, comprising substantially all of the hydrogen, a major portion of the methane and only a minor portion of the $C_2^+$ hydrocarbons from the gas feed, is withdrawn from phase separator 14 and passed by way of line 17 into and through indirect heat exchanger 18 wherein the gas is further cooled. The thus further cooled gas is passed by way of line 19, indirect heat exchanger 21, line 22, indirect heat exchanger 23, and line 24 into phase separator 25. A minor portion of the methane and a major portion of the $C_2^+$ hydrocarbons withdrawn from phase separator 14 by way of line 17 are condensed upon passage through indirect heat exchangers 18, 21 and 23 in series. The remaining uncondensed gas, comprising substantially all of the hydrogen and a major portion of the methane contained in the gas feed, is withdrawn from phase separator 25 and passed by way of line 26 into indirect heat exchanger 18, wherein it is passed in indirect heat exchanging relationship with the overhead stream from phase separator 14, and then is withdrawn from the system by way of line 27 and passed to a point of storage, further processing, or utilization as desired. The condensed liquid, comprising primarily methane, ethane, and ethylene with small amounts of hydrogen and $C_3^+$ hydrocarbons, is withdrawn from phase separator 25 and passed by way of line 28 into a feed inlet of fractionator 16 above the feed inlet for line 15. It is presently preferred that the streams in lines 15 and 28 be introduced into fractionator 16 at separate points as previously described, but it is within the contemplation of the invention to combine the fluid streams in lines 15 and 28 and to introduce the combined streams into fractionator 16 at a single feed point.

Overhead vapors from fractionator 16 are withdrawn by way of line 29 and passed into line 31 wherein the vapors are combined with additional vapors from line 30 which are obtained as hereinafter described. The combined vapors in line 31 are passed into indirect heat exchanger 32 and therein heated by indirect heat exchange. The thus heated vapors are passed by way of line 33 into the inlet of a first compressor stage 34. The compressed vapors are passed from compressor stage 34 by way of line 35 and are then combined with additional vapors from line 36. The combined vapors are then passed through line 37 into the inlet of a second compressor stage 38. The compressed vapors are passed from compressor stage 38 by way of line 39 into indirect heat exchanger 41 wherein the compressed vapors are cooled by indirect heat exchange with a suitable fluid such as air or water. The thus cooled compressed vapors are passed by way of line 42 into and through indirect heat exchanger 32 for further cooling. The thus further cooler compressed fluid is passed by way of line 43 into indirect heat exchanger 44. The bottoms stream is withdrawn from fractionator 16 by way of line 45. A portion of the withdrawn bottoms stream is removed from the system by way of line 46 while the remainder is passed by way of line 47 and expansion valve 48 into phase separator 40. A liquid stream is withdrawn from phase separator 40 and passed into heat exchanger 44 and therein is subjected to indirect heat exchange with the fluid in line 43. The thus heated portion of the bottoms stream is combined with the vapor overhead from phase separator 40, and the combined stream is compressed in compressor 49 and returned to the kettle section of fractionator 16 by way of line 50. The further cooled compressed fluid is withdrawn from heat exchanger 44 and passed by way of line 51 and expansion valve 52 into phase separator 53.

A liquid stream is withdrawn from phase separator 53 and a first portion thereof is passed by way of line 54 into indirect heat exchanger 21, wherein it is subjected to indirect heat exchange with the fluid contents of line 19. The thus warmed first portion is passed by way of line 55 into and through indirect heat exchanger 32 into line 36. A second portion of the liquid stream from phase separator 53 is passed by way of line 56, expansion valve 57, and line 58 into indirect heat exchanger 23, wherein it is subjected to indirect heat exchange with the fluid contents of line 22. The thus warmed second portion is passed by way of line 30 into line 31 wherein it is combined with the overhead vapor stream from fractionator 16 as previously described. A third portion of the liquid stream from phase separator 53 is passed by way of line 59, expansion valve 61, and line 62 into an upper portion of fractionator 16 as reflux therefor.

The flashed vapors and any uncondensed gases are withdrawn from phase separator 53 by way of line 63 and a first portion thereof is passed by way of line 64, valve 65 and line 66 into and through indirect heat exchanger 18. The thus heated first portion can be withdrawn from the system or, if desired, passed by way of line 67 into expansion turbine 68 with the expanded fluid being passed by way of line 69 into and through heat exchanger 18 and finally withdrawn from the system by way of line 71. A second portion of the overhead stream from phase separator 53 is passed by way of line 72 and valve 73 into line 55 and combined with the fluid therein.

The following example is presented in further illustration of the invention but should not be construed unduly in limitation thereof.

*Table I*

| Stream No. | Mols per hour | | | | | | |
|---|---|---|---|---|---|---|---|
| | $H_2$ | $N_2$ | $CH_4$ | $C_2H_4$ | $C_2H_6$ | $C_3+$ | Total |
| 13 | 1,407 | 84 | 568 | 1,188 | 853 | 40 | 4,140 |
| 15 | 7.02 | 2.61 | 96.37 | 901.39 | 731.41 | 36.69 | 1,775.49 |
| 19 | 1,399.98 | 81.39 | 471.63 | 286.61 | 121.59 | 3.31 | 2,364.51 |
| 27 | 1,397.33 | 79.32 | 384.27 | 33.62 | 10.60 | .54 | 1,905.68 |
| 28 | 2.65 | 2.07 | 87.36 | 252.99 | 110.99 | 2.77 | 458.83 |
| 46 | | | 0.4 | 1,153.44 | 842.40 | 39.46 | 2,035.70 |
| 29 | 10.0 | 6.5 | 680.49 | 51.83 | | | 748.82 |
| 62 | 0.33 | 1.82 | 497.16 | 50.89 | | | 550.2 |
| 54 | 0.33 | 1.82 | 498.97 | 51.08 | | | 552.2 |
| 58 | 0.26 | 1.42 | 388.46 | 39.76 | | | 429.9 |
| 66 | 9.67 | 4.68 | 183.33 | 0.94 | | | 198.62 |
| 72 | 25.80 | 14.10 | 557.46 | 2.64 | | | 600.0 |

*Table II*

| Stream No. | Pressure, p.s.i.a. | Temperature, °F. |
|---|---|---|
| 13 | 115 | −140 |
| 15 | 115 | −140 |
| 19 | 108 | −149 |
| 22 | 105 | −175 |
| 24 | 102 | −200 |
| 27 | 98 | −145 |
| 28 | 102 | −200 |
| 46 | 145 | −105 |
| 29 | 85 | −209 |
| 33 | 80 | 60 |
| 36 | 182 | 60 |
| 42 | 465 | 90 |
| 51 | 460 | −143 |
| 54 | 190 | −180 |
| 58 | 85 | −209 |
| 62 | 85 | −209 |
| 66 | 190 | −180 |
| 72 | 190 | −180 |

As illustrated in the drawing the overhead product from demethanizing fractionator 16 is removed from intermediate pressure phase separator 53 which also acts as flash vapor separator in the refrigeration cycle, part of the liquid from phase separator 53 being utilized as refrigerant in indirect heat exchangers 21 and 23 and the remainder of the liquid being flashed into the upper section of fractionator 16 to cause more light components to be released from the liquid reflux. This system permits an overhead product stream (line 66) which contains less than 0.5% ethylene while the reflux (line 62) contains almost 10% ethylene for the particular process of the example. This permits a considerable reduction in the amount of reflux required as compared with a conventional partial overhead condenser, thereby reducing the refrigeration required to form the reflux. The compression of the overhead vapor stream from fractionator 16 to a higher pressure permits the external refrigeration requirements to be fulfilled by an inexpensive cooling air or cooling water heat exchanger 41 in contrast with the expensive low temperature refrigeration system, for example an ethylene refrigeration system, which would be required in the absence of the compression of the overhead vapor stream. The present system also eliminates the temperature difference which would be needed to have a heat exchange in a conventional overhead condenser system, thereby further reducing refrigeration power requirements. The fractionator system of the invention provides a higher degree of separation than heretofore obtainable with a given size of fractionator. Thus, in the specific example the combined input of ethylene to fractionator 16 by way of lines 15 and 28 is 1154.38 mols per hour while only 0.94 mol per hour of ethylene is lost in the methane product stream in line 66, providing a recovery of 99.92 mol percent of the ethylene in the $C_2+$ product stream in line 46. Similarly the combined input of methane to fractionator 16 by way of lines 15 and 28 is 183.73 mols per hour and only 0.4 mol per hour of the methane is present in the $C_2+$ product stream, providing a removal of 99.77 mol percent of the methane from the ethylene stream. All of the ethane and $C_3+$ hydrocarbons in the feed to fractionator 16 are removed by way of the kettle product.

The system of the invention is particularly applicable to a gas feed stream having a pressure in the range of about 85 p.s.i.a. to about 200 p.s.i.a., preferably in the range of about 100 p.s.i.a. to about 125 p.s.i.a. This permits fractionator 16 to operate at an overhead pressure in the range of about 50 p.s.i.a. to about 170 p.s.i.a., thereby eliminating or substantially reducing the expensive high pressure construction of both the fractionator and accompanying components in systems where the fractionator is operated at an overhead pressure on the order of 400 p.s.i.a. or higher. The operation of fractionator 16 at a feed inlet pressure substantially the same as the pressure of the gas feed also eliminates the requirements of higher pressure systems of compressing the gas feed up to the higher pressure. Thus in some prior systems wherein the fractionator is operated at a pressure of approximately 400 p.s.i.g., the gas feed is compressed to approximately 800 p.s.i.g. The use of compressors on the fractionator overhead vapor stream offers several advantages over the use of compressors on the gas feed. The overhead vapor stream is only a fraction of the gas feed and thus requires less compression power, and the overhead vapor stream is free of tars and other heavy contaminants which can cause trouble in gas feed compressors. The outlet pressure of second compressor stage 38 is generally in the range of about 400 p.s.i.a. to about 500 p.s.i.a., while the pressure in phase separator 53 is generally in the range of about 50 p.s.i.a. to about 300 p.s.i.a. and preferably in the range of about 85 to about 225.

Reasonable variation and modification are possible within the scope of the foregoing disclosure, the drawing and the appended claims.

We claim:

1. A method for demethanizing a feed gas comprising methane, ethylene, ethane, proplyene and hydrogen, comprising chilling said feed gas in a first indirect heat exchanging zone to a temperature sufficiently low to condense a major portion of the $C_2^+$ hydrocarbon contained in said feed gas at a superatmospheric pressure and thereby produce a first uncondensed gas stream and a first liquid condensate stream; passing said first liquid condensate stream into a fractionation zone; passing said first uncondensed gas stream through second, third and fourth indirect heat exchanging zones in series and therein chilling said first uncondensed gas stream to a temperature sufficiently low to condense substantially all of the $C_2^+$ hydrocarbons contained in said first uncondensed gas stream and thereby produce a second uncondensed gas stream and a second liquid condensate stream, passing said second uncondensed gas stream through said second indirect heat exchanging zone in indirect heat exchanging relationship with said first uncondensed gas stream; passing said second liquid condensate stream into said fractionation zone; withdrawing an overhead vapor stream from said fractionation zone; admixing a first heated fluid with said overhead vapor stream to form a first combined stream; passing said combined stream through a fifth indirect heat exchanging zone wherein said combined stream is heated; compressing the thus heated first combined stream in a first compressing zone; admixing with the thus compressed heated first combined stream a second heated fluid to form a second combined stream; compressing said second combined stream in a second compressing zone; passing the thus compressed second combined stream in indirect heat exchange with cooling water and then through said fifth indirect heat exchanging zone in indirect heat exchanging relationship with said first combined stream thereby chilling said compresesd second combined stream; withdrawing a bottoms stream from said fractionation zone, passing at least a portion of said bottoms stream in indirect heat exchanging relationship with the thus chilled compressed second combined stream to further cool said thus chilled compressed second combined stream; flashing the thus further cooled compressed second combined stream to produce a third uncondensed gas stream and a third liquid condensate stream; passing a first portion of said third liquid condensate stream through said third indirect heat exchanging zone in indirect heat exchanging relationship with said first uncondensed gas stream; admixing the thus warmed first portion of said third liquid condensate stream with a first portion of said third uncondensed gas stream to form a third combined stream; passing said third combined stream through said fifth indirect heat exchanging zone in indirect heat exchanging relationship with said first combined stream and to the step of admixing with the thus compressed heated first combined stream a second heated fluid as the source of said second heated fluid; flashing a second portion of said third liquid condensate stream; passing the thus flashed second portion through said fourth indirect heat exchanging zone in indirect heat exchanging relationship with said first uncondensed gas stream and then to the step of admixing a first heated fluid with said overhead vapor stream as the source of said first heated fluid; flashing a third portion of said third liquid condensate stream; passing the thus flashed third portion into said fractionation zone as reflux therefor; passing a second portion of said third uncondensed gas stream through said second indirect heat exchanging zone in indirect heat exchanging relationship with said first uncondensed gas stream; expanding the thus heated second portion of said third uncondensed gas stream; passing the thus expanded heated second portion of said third uncondensed gas stream through said second indirect heat exchanging zone in indirect heat exchanging relationship with said first uncondensed gas stream; said bottoms stream comprising substantially all of the $C_2^+$ hydrocarbons introduced into said fractionation zone; and said third uncondensed gas stream containing substantially all of the methane introduced into said fractionation zone.

2. A method for demethanizing a feed gas comprising methane, ethylene, ethane, propylene and hydrogen, comprising chilling said feed gas in a first indirect heat exchanging zone to a temperature sufficiently low to condense a major portion of the $C_2^+$ hydrocarbon contained in said feed gas at a superatmospheric pressure and thereby produce a first uncondensed gas stream and a first liquid condensate stream; passing said first liquid condensate stream into a fractionation zone; passing said first uncondensed gas stream through second, third and fourth indirect heat exchanging zones in series and therein chilling said first uncondensed gas stream to a temperature sufficiently low to condense substantially all of the $C_2^+$ hydrocarbons contained in said first uncondensed gas stream and thereby produce a second uncondensed gas stream and a second liquid condensate stream, passing said second uncondensed gas stream through said second indirect heat exchanging zone in indirect heat exchanging relationship with said first uncondensed gas stream; passing said second liquid condensate stream into said fractionation zone; withdrawing an overhead vapor stream from said fractionation zone; admixing a first heated fluid with said overhead vapor stream to form a first combined stream; passing said combined stream through a fifth indirect heat exchanging zone wherein said combined stream is heated; compressing the thus heated first combined stream in a first compressing zone; admixing with the thus compressed heated first combined stream a second heated fluid to form a second combined stream; compressing said second combined stream in a second compressing zone; passing the thus compressed second combined stream in indirect heat exchange with cooling water and then through said fifth indirect heat exchanging zone in indirect heat exchanging relationship with said first combined stream thereby chilling said compressed second combined stream; passing the thus chilled compressed second combined stream through a sixth indirect heat exchanging zone to further cool said thus chilled compressed second combined stream; flashing the thus further cooled compressed second combined stream to produce a third uncondensed gas stream and a third liquid condensate stream; passing a first portion of said third liquid condensate stream through said third indirect heat exchanging zone in indirect heat exchanging relationship with said first uncondensed gas stream; admixing the thus warmed first portion of said third liquid condensate stream with a first portion of said third uncondensed gas stream to form a third combined stream; passing said third combined stream through said fifth indirect heat exchanging zone in indirect heat exchanging relationship with said first combined stream and to the step of admixing with the thus compressed heated first combined stream and a second heated fluid as the source of said second heated fluid; flashing a second portion of said third liquid condensate stream; passing the thus flashed second portion through said fourth indirect heat exchanging zone in indirect heat exchanging relationship with said first uncondensed gas stream and then to the step of admixing a first heated fluid with said overhead vapor stream as the source of said first heated fluid; flashing a third portion of said third liquid condensate stream; passing the thus flashed third portion into said fractionation zone as reflux therefor; passing a second portion of said third uncondensed gas stream through said second indirect heat exchanging zone in indirect heat exchanging relationship with said first uncondensed gas stream; and withdrawing from said fractionation zone a bottoms stream comprising substantially all of the $C_2^+$ hydrocarbons introduced into said fractionation zone; said third uncondensed gas stream containing substantially all of the methane introduced into said fractionation zone.

3. A method for demethanizing a feed gas comprising methane, ethylene, ethane, propylene and hydrogen, comprising chilling said feed gas in a first indirect heat exchanging zone to a temperature sufficiently low to condense a major portion of the $C_2^+$ hydrocarbon conntained in said feed gas at a superatmospheric pressure and thereby produce a first uncondensed gas stream and a first liquid condensate stream; passing said first liquid condensate stream into a fractionation zone; passing said first uncondensed gas stream through a second and a third indirect heat exchanging zone in series and therein chilling said first uncondensed gas stream to a temperature sufficiently low to condense substantially all of the $C_2^+$ hydrocarbons contained in said first uncondensed gas stream and thereby produce a second uncondensed gas stream and a second liquid condensate stream, passing said second uncondensed gas stream through said second indirect heat exchanging zone in indirect heat exchanging relationship with said first uncondensed gas stream; passing said second liquid condensate stream into said fractionation zone; withdrawing an overhead vapor stream from said fractionation zone; admixing a first heated fluid with said overhead vapor stream to form a first combined stream; passing said combined stream through a fourth indirect heat exchanging zone wherein said combined stream is heated; compressing the thus heated first combined stream; passing the thus compressed first combined stream in indirect heat exchange with cooling water and then through said fourth indirect heat exchanging zone in indirect heat exchanging relationship with said first combined stream thereby chilling said compressed first combined stream; flashing the thus chilled compressed first combined stream to produce a third uncondensed gas stream and a third liquid condensate stream; passing a first portion of said third liquid condensate stream through said third indirect heat exchanging zone in indirect heat exchanging relationship with said first uncondensed gas stream and then to the step of admixing a first heated fluid with said overhead vapor stream as the source of said first heated fluid; passing a second portion of said third liquid condensate stream into said fractionation zone as reflux therefor; passing at least a portion of said third uncondensed gas stream through said second indirect heat exchanging zone in indirect heat exchanging relationship with said first uncondensed gas stream; and withdrawing from said fractionation zone a bottoms stream comprising substantially all of the $C_2^+$ hydrocarbons introduced into said fractionation zone; said third uncondensed gas stream containing substantially all of the methane introduced into said fractionation zone.

4. A method for demethanizing a feed gas comprising methane, ethylene, ethane, propylene and hydrogen, comprising chilling said feed gas in a first indirect heat exchanging zone to a temperature sufficiently low to condense a major portion of the $C_2^+$ hydrocarbon contained in said feed gas at a superatmospheric pressure and thereby produce a first uncondensed gas stream and a first liquid condensate stream; passing said first liquid condensate stream into a fractionation zone; passing said first uncondensed gas stream through a second and third indirect heat exchanging zone in series and therein chilling said first uncondensed gas stream to a temperature sufficiently low to condense substantially all of the $C_2^+$ hydrocarbons contained in said first uncondensed gas stream and thereby produce a second uncondensed gas stream and a second liquid condensate stream, passing said second uncondensed gas stream through said second indirect heat exchanging zone in indirect heat exchanging relationship with said first uncondensed gas stream; passing said second liquid condensate stream into said fractionation zone; withdrawing an overhead vapor stream from said fractionation zone; passing said overhead vapor stream through a fourth indirect heat exchanging zone wherein said overhead vapor stream is heated; compressing the thus heated overhead vapor stream in a first compressing zone; admixing with the thus compressed heated overhead vapor stream a heated fluid to form a first combined stream; compressing said first combined stream in a second compressing zone; passing the thus compressed first combined stream in indirect heat exchange with cooling water and then through said fourth indirect heat exchanging zone in indirect heat exchanging relationship with said overhead vapor stream thereby chilling said compressed first combined stream; flashing the thus chilled compressed first combined stream to produce a third uncondensed gas stream and a third liquid condensate stream; passing a first portion of said third liquid condensate stream through said third indirect heat exchanging zone in indirect heat exchanging relationship with said first uncondensed gas stream; admixing the thus warmed first portion of said third liquid condensate stream with a first portion of said third uncondensed gas stream to form a second combined stream; passing said second combined stream through said fourth indirect heat exchanging zone in indirect heat exchanging relationship with said overhead vapor stream and to the step of admixing with the thus compressed heated overhead vapor stream a heated fluid as the source of said heated fluid; passing a second portion of said third liquid condensate stream into said fractionation zone as reflux therefor; passing at least a portion of said third uncondensed gas stream through said second indirect heat exchanging zone in indirect heat exchanging relationship with said first uncondensed gas stream; and withdrawing from said fractionation zone a bottoms stream comprising substantially all of the $C_2^+$ hydrocarbons introduced into said fractionation zone; said third uncondensed gas stream containing substantially all of the methane introduced into said fractionation zone.

5. A method for demethanizing a feed gas comprising a low boiling component, an intermediate boiling component and a high boiling component, comprising chilling said feed gas in a first indirect heat exchanging zone to a temperature sufficiently low to condense a major portion of the intermediate and high boiling components contained in said feed gas at a superatmospheric pressure and thereby produce a first uncondensed gas stream and a first liquid condensate stream; passing said first liquid condensate stream into a fractionation zone; passing said first uncondensed gas stream through second, third and fourth indirect heat exchanging zones in series and therein chilling said first uncondensed gas stream to a temperature sufficiently low to condense substantially all of the intermediate and high boiling components contained in said first uncondensed gas stream and thereby produce a second uncondensed gas stream and a second liquid condensate stream, passing said second uncondensed gas stream through said second indirect heat exchanging zone in indirect heat exchanging relationship with said first uncondensed gas stream; passing said second liquid condensate stream into said fractionation zone; withdrawing an overhead vapor stream from said fractionation zone; admixing a first heated fluid with said overhead vapor stream to form a first combined stream; passing said combined stream through a fifth indirect heat exchanging zone wherein said combined stream is heated; compressing the thus heated first combined stream in a first compressing zone; admixing with the thus compressed heated first combined stream a second heated fluid to form a second combined stream; compressing said second combined stream in a second compressing zone; passing the thus compressed second combined stream in indirect heat exchange with cooling water and then through said fifth indirect heat exchanging zone in indirect heat exchanging relationship with said first combined stream thereby chilling said compressed second combined stream; passing the thus chilled compressed second combined stream through a sixth indirect heat exchanging zone to further cool said thus chilled compressed second combined stream; flashing the thus further cooled compressed second combined stream to produce a third uncondensed gas stream and a third liquid condensate stream; passing a first portion of said third liquid condensate stream through said third indirect heat exchanging zone in indirect heat exchanging relationship with said first uncondensed gas stream; admixing the thus warmed first portion of said third liquid condensate stream with a first portion of said third uncondensed gas stream to form a third combined stream; passing said third combined stream through said fifth indirect heat exchanging zone in indirect heat exchanging relationship with said first combined stream and to the step of admixing with the thus compressed heated first combined stream a second heated fluid as the source of said second heated fluid; flashing a second portion of said third liquid condensate stream; passing the thus flashed second portion through said fourth indirect heat exchanging zone in indirect heat exchanging relationship with said first uncondensed gas stream and then to the step of admixing a first heated fluid with said overhead vapor stream as the source of said first heated fluid; flashing a third portion of said third liquid condensate stream; passing the thus flashed third portion into said fractionation zone as reflux therefor; passing a second portion of said third uncondensed gas stream through said second indirect heat exchanging zone in indirect heat exchanging relationship with said first uncondensed gas stream; and withdrawing from said fractionation zone a bottoms stream comprising substantially all of the intermediate and high boiling components introduced into said fractionation zone; said third uncondensed gas stream containing substantially all of the low boiling components introduced into said fractionation zone.

6. Apparatus for separating a gas feed comprising a low boiling component, an intermediate boiling component and a high boiling component comprising a first indirect heat exchanger, means for passing said feed gas through said first indirect heat exchanger and therein cooling said feed gas to a temperature sufficiently low to condense a major portion of the intermediate and high boiling components contained in said feed gas at a superatmospheric pressure, a first phase separator, means for passing the thus cooled feed gas into said first phase separator, a fractionator, means for withdrawing from said first phase separator and passing into said fractionator a first liquid condensate stream, second, third and fourth indirect heat exchangers, means for withdrawing from said first phase separator a first uncondensed gas stream and for passing said first uncondensed gas stream through said second, third and fourth indirect heat exchangers in series and therein chilling said first uncondensed gas stream to a temperature sufficiently low to condense substantially all of the intermediate and high boiling components contained in said first uncondensed gas stream, a second phase separator, means for passing the thus chilled first uncondensed gas stream into said second phase separator, means for withdrawing from said second phase separator a second uncondensed gas stream and for passing said second uncondensed gas stream through said second indirect heat exchanger in indirect heat exchanging relationship with said first uncondensed gas stream; means for withdrawing from said second phase separator a second liquid condensate stream and for passing said second liquid condensate stream into said fractionator; means for withdrawing an overhead vapor stream from said fractionator; a fifth indirect heat exchanger, means for admixing a first heated fluid with said overhead vapor stream to form a first combined stream and for passing said combined stream through said fifth indirect heat exchanger wherein said combined stream is heated; means for compressing the thus heated first combined stream; means for admixing with the thus compressed heated first combined stream a second heated fluid to form a second combined stream; means for compressing said second combined stream; means for passing the thus compressed second combined stream in indirect heat exchanging relationship with cooling water and then through said fifth indirect heat exchanger in indirect heat exchanging relationship with said first combined stream thereby chilling said compressed second combined stream; a sixth indirect heat exchanger, means for passing the thus chilled compressed second combined stream through said sixth indirect heat exchanger to further cool said thus chilled compressed second combined stream; means for flashing the thus further cooled compressed second combined stream; a third phase separator; means for introducing the thus flashed stream into said third phase separator; means for withdrawing from said third phase separator a first portion of the liquid condensate and for passing said first portion through said third indirect heat exchanger in indirect heat exchanging relationship with said first uncondensed gas stream; means for admixing the thus warmed first portion with a first portion of the uncondensed gas from said third phase separator to form a third combined stream; means for passing said third combined stream through said fifth indirect heat exchanger in indirect heat exchanging relationship with said first combined stream and to said means for admixing with the thus compressed heated first combined stream a second heated fluid; means for flashing a second portion of the liquid condensate from said third phase separator and for passing the thus flashed second portion through said fourth indirect heat exchanger in indirect heat exchanging relationship with said first uncondensed gas stream and then to said means for admixing a first heated fluid with said overhead vapor stream; means for flashing a third portion of the liquid condensate from said third phase separator and for passing the thus flashed third portion into said fractionator as reflux therefor; means for passing a second portion of the uncondensed gas from said third phase separator through said second indirect heat exchanger in indirect heat exchanging relationship with said first uncondensed gas stream; and means for withdrawing from said fractionator a bottoms stream comprising substantially all of the intermediate and high boiling components introduced into said fractionator, the uncondensed gas in said third phase separator containing substantially all of the low boiling components introduced into said fractionator.

7. A method for demethanizing a feed gas comprising methane, ethylene, ethane, propylene and hydrogen, comprising chilling said feed gas in a first indirect heat exchanging zone to a temperature sufficiently low to condense a major portion of the $C_2^+$ hydrocarbon contained in said feed gas at a pressure in the range of about 85 p.s.i.a. to about 200 p.s.i.a. and thereby produce a first uncondensed gas stream and a first liquid condensate stream; passing said first liquid condensate stream into a fractionation zone; passing said first uncondensed gas stream through second, third and fourth indirect heat exchanging zones in series and therein chilling said first uncondensed gas stream to a temperature sufficiently low to condense substantially all of the $C_2^+$ hydrocarbons contained in said first uncondensed gas stream and thereby produce a second uncondensed gas stream and a second liquid condensate stream, passing said second uncondensed gas stream through said second indirect heat exchanging zone in indirect heat exchanging relationship with said first uncondensed gas stream; maintaining the overhead pressure in said fractionation zone in the range of about 50 p.s.i.a. to about 190 p.s.i.a., passing said second liquid condensate stream into said fractionation zone; withdrawing an overhead vapor stream from said fractionation zone; admixing a first heated fluid with said overhead vapor stream to form a first combined stream; passing said combined stream through a fifth indirect heat exchanging zone wherein said combined stream is heated; compressing the thus heated first combined stream in a first compressing zone; admixing with the thus compressed heated first combined stream a second heated fluid to form a second combined stream; compressing said second combined stream in a second compressing zone to a pressure in the range of about 400 p.s.i.a. to about 500 p.s.i.a.; passing the thus compressed second combined stream in indirect heat exchange with cooling water and then through said fifth indirect heat exchanging zone in indirect heat exchanging relationship with said first combined stream thereby chilling said compressed second combined stream; withdrawing a bottoms stream from said fractionation zone, passing at least a portion of said bottoms stream in indirect heat exchanging relationship with the thus chilled compressed second combined stream to further cool said thus chilled compressed second combined stream; flashing the thus further cooled compressed second combined stream to a pressure in the range of about 85 p.s.i.a. to about 225 p.s.i.a. to produce a third uncondensed gas stream and a third liquid condensate stream; passing a first portion of said third liquid condensate stream through said third indirect heat exchanging zone in indirect heat exchanging relationship with said first uncondensed gas stream; admixing the thus warmed first portion of said third liquid condensate stream with a first portion of said third uncondensed gas stream to form a third combined stream; passing said third combined stream through said fifth indirect heat exchanging zone in indirect heat exchanging relationship with said first combined stream and to the step of admixing with the thus compressed heated first combined stream a second heated fluid as the source of said second heated fluid; flashing a second portion of said third liquid condensate stream; passing the thus flashed second portion through said fourth indirect heat exchanging zone in indirect heat exchanging relationship with said first uncondensed gas stream and then to the step of admixing a first heated fluid with said overhead vapor stream as the source of said first heated fluid; flashing a third portion of said third liquid condensate stream; passing the thus flashed third portion into said fractionation zone as reflux therefor; passing a second portion of said third uncondensed gas stream through said second indirect heat exchanging zone in indirect heat exchanging relationship with said first uncondensed gas stream; expending the thus heated second portion of said third uncondensed gas stream; passing the thus expanded heated second portion of said third uncondensed gas stream through said second indirect heat exchanging zone in indirect heat exchanging relationship with said first uncondensed gas stream; said bottoms stream comprising substantially all of the $C_2^+$ hydrocarbons introduced into said fractionation zone; and said third uncondensed gas stream containing substantially all of the methane introduced into said fractionation zone.

References Cited by the Examiner

UNITED STATES PATENTS

| | | |
|---|---|---|
| 1,074,094 | 9/13 | Blau. |
| 2,236,963 | 4/41 | Babcock. |
| 2,600,110 | 6/52 | Hachmuth _____ 62—26 X |
| 2,645,104 | 7/53 | Kniel _____ 62—26 X |
| 2,880,592 | 4/59 | Davison _____ 62—28 |

NORMAN YUDKOFF, *Primary Examiner.*